(12) United States Patent
Hosono et al.

(10) Patent No.: US 8,983,474 B2
(45) Date of Patent: Mar. 17, 2015

(54) MOBILE COMMUNICATION SYSTEM, BASE STATION, AND MOBILE COMMUNICATION METHOD

(75) Inventors: Hiroyuki Hosono, Tokyo (JP); Takeshi Terayama, Tokyo (JP); Takeshi Okamoto, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 121 days.

(21) Appl. No.: 13/701,909

(22) PCT Filed: Jun. 3, 2011

(86) PCT No.: PCT/JP2011/062820
§ 371 (c)(1),
(2), (4) Date: Feb. 5, 2013

(87) PCT Pub. No.: WO2011/152527
PCT Pub. Date: Dec. 8, 2011

(65) Prior Publication Data
US 2013/0130696 A1 May 23, 2013

(30) Foreign Application Priority Data

Jun. 4, 2010 (JP) .................... 2010-129426

(51) Int. Cl.
*H04W 36/00* (2009.01)
*H04W 36/30* (2009.01)
*H04W 48/16* (2009.01)
*H04W 84/04* (2009.01)

(52) U.S. Cl.
CPC ............. *H04W 36/30* (2013.01); *H04W 48/16* (2013.01); *H04W 84/045* (2013.01)
USPC ............ 455/438; 370/331; 370/338; 370/350

(58) Field of Classification Search
CPC ..... H04W 16/16; H04W 16/32; H04W 24/02; H04W 24/10; H04W 52/30; H04W 52/32; H04W 52/34; H04W 52/38; H04W 52/40; H04W 52/143; H04W 52/244; H04W 52/245; H04W 56/00
USPC .................. 455/436–444; 370/328–338, 350
See application file for complete search history.

(56) References Cited

U.S. PATENT DOCUMENTS

2003/0045320 A1* 3/2003 Tanno et al. .................. 455/522
2010/0317386 A1* 12/2010 Da Silva et al. ............. 455/507

FOREIGN PATENT DOCUMENTS

WO 2009 053710 4/2009

OTHER PUBLICATIONS

3GPPS TS 22.220, 3rd Generation Partnership Project; Technical Specification Group Services and System Aspects; Service requirements for Home Node B (HNB) and Home eNode B (HeNB) (Release 11), V11.6.0, LTE, pp. 1 to 25, (Sep. 2012).
International Search Report Issued Aug. 30, 2011 in PCT/JP11/062820 Filed Jun. 3, 2011.

* cited by examiner

*Primary Examiner* — Vladimir Magloire
*Assistant Examiner* — Shantell L Heiber
(74) *Attorney, Agent, or Firm* — Oblon, McClelland, Maier & Neustadt, L.L.P.

(57) ABSTRACT

A radio controller 100 includes an acquisition unit configured to acquire a radio communication state of a neighboring cell around the cell formed by a base station 200, and a threshold determination unit configured to determine an in-out threshold based on an acquisition result of the radio communication state by the acquisition unit. The threshold determination unit calculates an estimated overall reception level within a frequency band at a point at which the reception level of the common control channel transmitted by the base station 200 becomes the highest in the cell formed by the base station 200, based on the reception level of the common control channel and the overall reception level, and determines the in-out threshold based on the calculated estimated overall reception level.

6 Claims, 5 Drawing Sheets

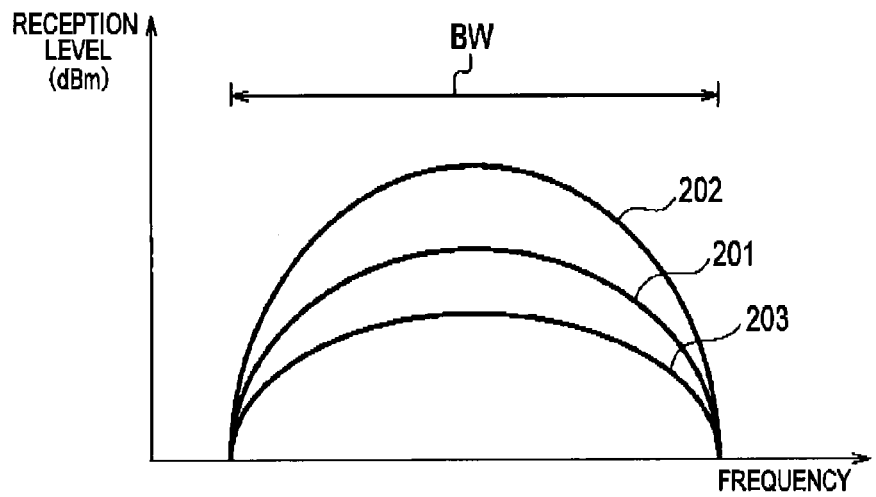

MOBILE COMMUNICATION SYSTEM, BASE STATION, AND MOBILE COMMUNICATION METHOD

TECHNICAL FIELD

The present invention relates to a mobile communication system, a base station, and a mobile communication method that control an in-out threshold for determining whether a mobile station is to camp on a cell formed by the base station.

BACKGROUND ART

Mobile communication systems have been required to ensure service qualities in accordance with the contents of communication requests randomly made by mobile stations (users). Thus, when installing a base station, a mobile telecommunications carrier generally estimates the size of a service area and traffic generated in the service area, and use means such as simulation to design the installation location and configuration of the base station as well as radio parameters such as a transmission level of a downlink common control channel transmitted from the base station.

The designing of a base station involves determining an in-out threshold that is a threshold for determining whether a mobile station is to camp on a cell formed by the base station. For example, in a W-CDMA system, based on Qqualmin broadcasted from a cell whose Ec/N0 measured is the highest, the mobile station determines to camp on the cell when the measured Ec/N0 exceeds Qqualmin. When Ec/N0 periodically measured after completion of the procedure to camp on the cell becomes equal to or lower than Qqualmin, the mobile station attempts to camp on another cell.

In recent years, in addition to base stations for public communications installed by the mobile telecommunications carriers as described above, there has been an increase in small base stations (Home Nodes) installed at home and the like by users of mobile stations. As compared with the base stations for public communications, such a small base station is used by only limited users and can form a small sized cell. Accordingly, the throughput can be expected to increase (see. Non-Patent Document 1).

PRIOR ART DOCUMENT

Non-Patent Document

Non-Patent Document 1: 3GPP TS 22.220, Service requirements for Home NodeBs (UNITS) and Home eNodeBs (LTE)

SUMMARY OF THE INVENTION

The small base station such as the Home NodeB can be freely installed by the user of the mobile station. Thus, the designing of the base station by using means such as simulation and the like as described above cannot be employed. Accordingly, Self Configuration by which the small base station or the like autonomously sets the radio parameters is required.

However, in an apartment and the like, the small base stations are likely to be installed in a crowded manner. Thus, a mobile station of a user cannot always camp on a cell formed by a small base station installed by the user, but may possibly camp on another cell instead. When this happens, the mobile station cannot enjoy advantage of an increase in throughput provided by the small base station.

Thus, an objective of the present invention is to provide a mobile communication system, a base station, and a mobile communication method with which a mobile station can surely enjoy advantage of an increase in throughput provided by a small base station.

A feature of the present invention relates to a mobile communication system configured to control an in-out threshold (Qqualmin) for determining whether a mobile station (mobile station 300) is to camp on a cell (cell 250) formed by a base station (e.g., base station 200) managed by a mobile telecommunications carrier or a user receiving a communication service provided by the mobile telecommunications carrier. The system includes; an acquisition unit (radio information acquisition unit 110) configured to acquire a radio communication state of a neighboring cell (e.g., cell 251) around the cell formed by the base station; and a threshold determination unit (in-out threshold determination unit 130) configured to determine the in-out threshold based on an acquisition result of the radio communication state by the acquisition unit.

The acquisition unit measures a reception level of a common control channel transmitted by the neighboring cell in the base station and an overall reception level within a predetermined frequency band in the base station. The threshold determination unit calculates an estimated overall reception level within the frequency band at a point at which the reception level of the common control channel transmitted by the base station becomes the highest in the cell formed by the base station, based on the reception level of the common control channel and the overall reception level, and determines the in-out threshold based on the calculated estimated overall reception level.

In the feature of the present invention described above, the threshold determination unit may calculate, as the estimated overall reception level, a value obtained by adding the overall reception level to a sum of a first offset value and the highest reception level among the reception levels of the common control channels transmitted by the neighboring cells.

In the feature of the present invention described above, the threshold determination unit may calculate as the in-out threshold a value obtained by dividing the highest reception level by the estimated overall reception level.

In the feature of the present invention described above, the threshold determination unit may calculate the in-out threshold by adding a second offset value to the value obtained by dividing the highest reception level by the estimated overall reception level.

In the feature of the present invention described above, the acquisition unit may use a total reception power of the common control channels transmitted by the neighboring cells, instead of the overall reception level.

BRIEF DESCRIPTION OF DRAWINGS

FIG. 5 is a diagram showing an example of measurement for an overall reception level of neighboring cells (base stations 201 to 203) within a frequency band BW.

FIG. 6 is a diagram showing an example of the database 500 in which reception levels are stored.

MODE FOR CARRYING OUT THE INVENTION

Figure 1:
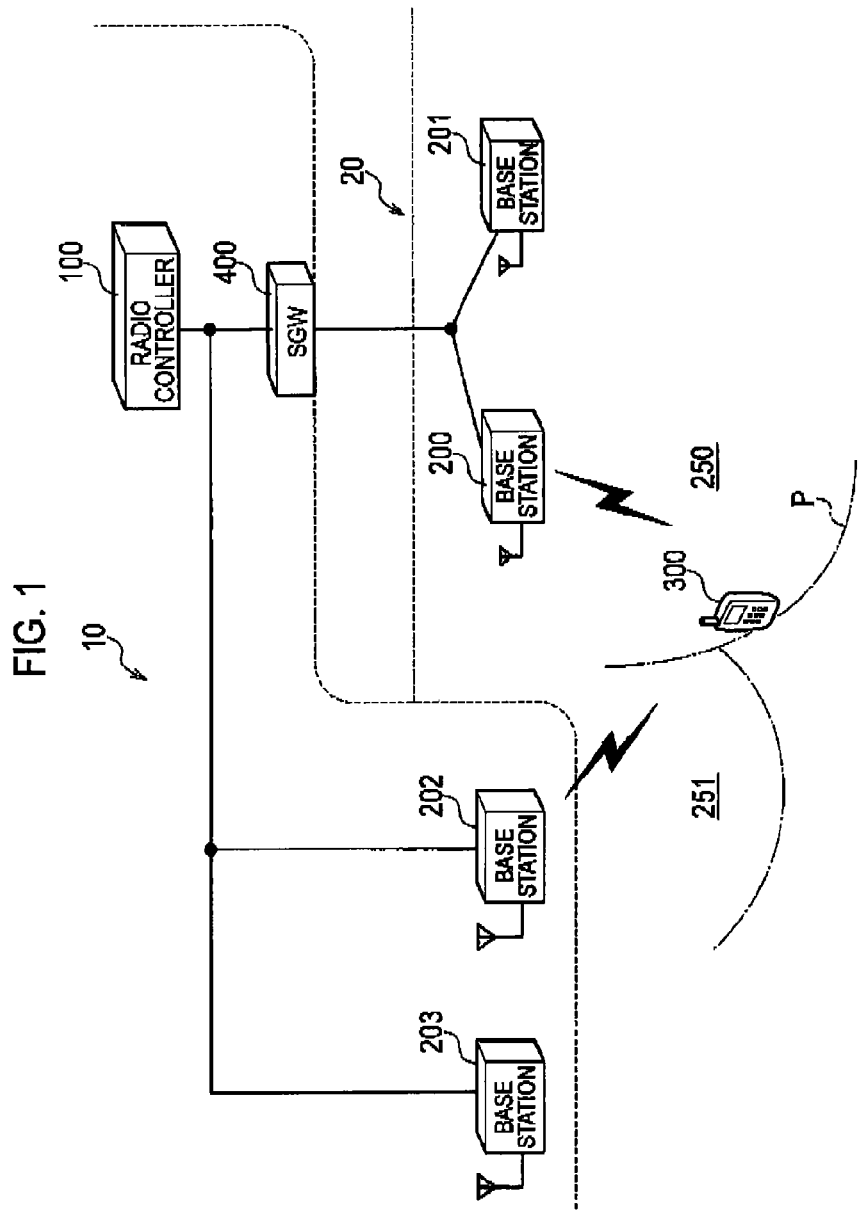
FIG. 1 is an overall schematic configuration diagram of a mobile communication system according to an embodiment of the present invention.

Now, an embodiment of the present invention is described below by referring to the drawings. In the following description of the drawings, same or similar reference numerals are given to denote same or similar portions. Note that the drawings are merely schematically shown and proportions of sizes and the like are different from actual ones. Thus, specific sizes and, the like should be judged by referring to the description below.

Thus, specific sizes and the like should be judged by referring to the description below. In addition, there are of course included portions where relationships or percentages of sizes of the drawings are different with respect to one another.

(1) Overall Schematic Configuration of Mobile Communication System

FIG. 1 is an overall schematic configuration diagram of a mobile communication system according to this embodiment. Specifically, FIG. 1 shows a typical radio access network in a mobile communication system.

The mobile communication system shown in FIG. 1 supports a w-CDMA scheme, and base stations 200 to, 203 are communicably connected to a radio controller 100. The radio controller 100 is configured to allocate a radio parameter required for performing radio communications with a mobile station 300 to each of the base stations 200 to 203, and perform managing thereof.

Particularly, the mobile communication system according to this embodiment controls an, in-out threshold (Qqualmin). With the in-out threshold, it is determined whether the mobile station 300 is to be in a cell (cell 250) formed by a base station (e.g., base station 200) installed by a mobile telecommunications carrier or a user of a communication service provided by the mobile telecommunications carrier.

The base station 200 and the base station 201 are each a small base station (Home eNodeB) managed by the user of the communication service provided by the mobile telecommunications carrier. The base station 200 and the base station 201 are both provided in a Local Access Network (LAN) managed by the user, and are connected to the radio controller 100 provided on a mobile telecommunications carrier network 10 through an access line carrier network 20 providing FTTH or ADSL.

A Security Gateway (SGW) 400 is provided at a border between the mobile telecommunications carrier network 10 and the access line carrier network 20. The SGW 400 is a gateway for protecting the mobile telecommunications carrier network 10 from an unauthorized access from other communication networks. The SGW 400 permits the access only to the mobile telecommunications carrier network 10 authorized through a predetermined authentication procedure.

In this embodiment, the base station 200 and the base station 201 are assumed to be respectively owned by different users. Thus, the mobile station of the user managing one of the base stations is not authorized to access the other base station. Meanwhile, the base station 202 and the base station 203 are base stations for public communications and are provided on the mobile telecommunications carrier network 10. The mobile station of the user of the mobile telecommunications carrier can connect to the base station 202 and the base station 203 without any particular limitations.

(2) Functional Block Configuration of Radio Controller 100

Figure 2:
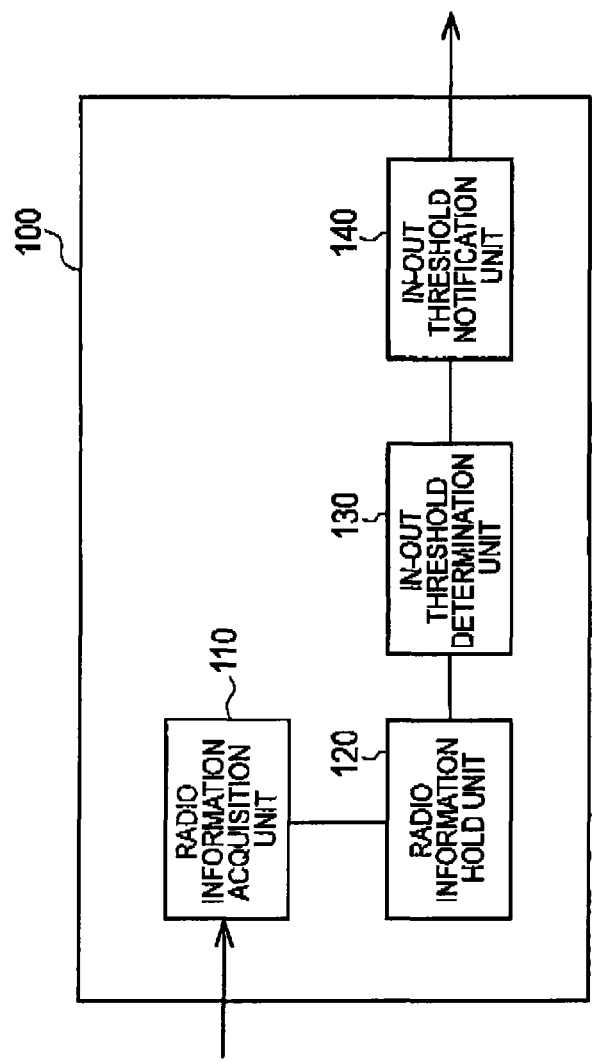
FIG. 2 is a functional block configuration diagram of a radio controller 100 according to the embodiment of the present invention.

FIG. 2 is a functional block diagram of the radio controller 100. As shown in FIG. 2 the radio controller includes a radio information acquisition unit 110, a radio information hold unit 120, an in-out threshold determination unit 130, and an in-out threshold notification unit 140.

The radio information acquisition unit 110 acquires a radio communication state of a neighboring cell (e.g., cell 251) around a cell (cell 250) formed by a base station (e.g., base station 200). Specifically, the radio information acquisition unit 110 acquires a reception level of the common control channel transmitted from the neighboring cell, in the own base station (e.g., base station 200) and an overall reception level in the base station within a predetermined frequency band, i.e., a frequency band allocated to all the neighboring cells. A control channel receivable by the neighboring cell, such as a common pilot channel (CPICH) for example, can be used as the common control channel.

The radio information hold unit 120 is configured to hold the information (reception level) indicating the radio communication state of the neighboring cell (base station) acquired by the radio information acquisition unit 110. Specifically, the radio information hold unit 120 holds information in the form of a database 500 shown in FIG. 6.

The in-out threshold determination unit 130 determines the in-out threshold (Qqualmin) based on the acquired result of the radio communication state by the radio information acquisition unit 110. Specifically, the in-out threshold determination unit 130 calculates an estimated overall reception level within the frequency band at a point P (FIG. 1) at which the reception level for the common control channel transmitted by the base station becomes the highest, in a cell formed by a base station. The calculation is based on the reception level for the common control channel and the overall reception level within the frequency band. Then, the in-out threshold determination unit 130 determines the in-out threshold based on the calculated estimated overall reception level. The operation of the in-out threshold determination unit 130 will be described later in detail.

The in-out threshold notification unit 140 transmits the in-out threshold determined by the in-out threshold determination unit 130 to the subject base station (e.g., base station 200).

(3) Operation of Mobile Communication System

Figure 3:
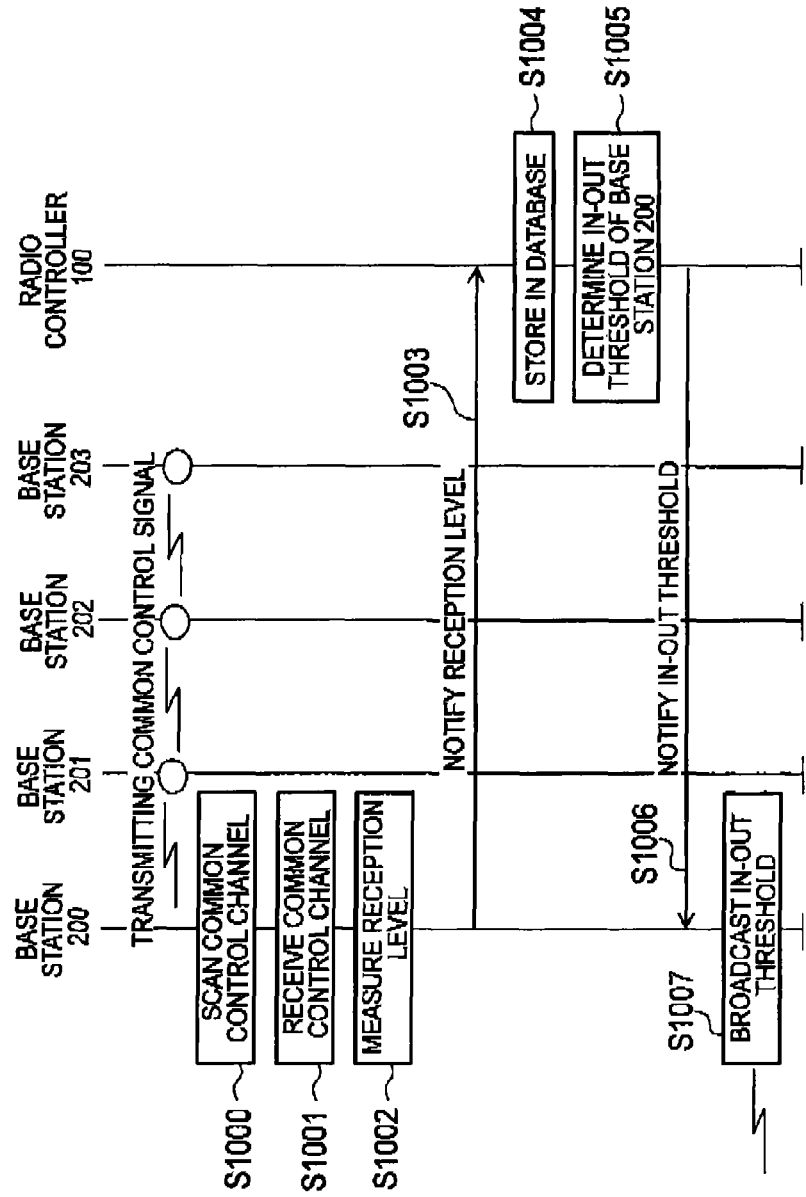
FIG. 3 is a diagram showing a sequence for determining an in-out threshold in the mobile communication system.

Next, an operation of the mobile communication described above, more specifically, an operation performed by the radio controller 100 for determining the in-out threshold (Qqualmin) is described. FIG. 3 shows a sequence in a mobile communication system related to the determination of the in-out threshold.

Here, a description is given on the operation for determining the in-out threshold of the base station 200 in a case where the base station 200 is newly installed at a location neighboring the service area of the already operating base station 201 to 203. It is to be noted that the sequence in the case where the base station is newly installed shown in FIG. 3 can be similarly applied in a case where the operating base station automatically updates the in-out threshold.

As shown in FIG. 3, the base station 200 (Home NodeB) newly installed scans the common control channel transmitted by the neighboring cells (base stations 201 to 203), and attempts to receive the common control channel. (Step S1000). Here, the base station 200 receives the common control channels transmitted by the base stations 201 to 203 (Step S1001).

The base station 200 measures the reception levels of the common control channel of the base stations 201 to 203 and the overall reception level within the frequency band BW (see FIG. 5) allocated to the base station 200 for the transmission and reception of information using various channels, that is, the reception levels of the neighboring cells (base stations 201 to 203) operating within the frequency band BW (Step S1002). FIG. 5 shows an example of measurement for the overall reception level of the neighboring cells Within the frequency band BW.

The base station 200 notifies the radio controller 100 of the measured reception level (Step S1003). The radio controller 100 stores the reception level notified from the base station 200 in the database 500 (Step S1004). FIG. 6 shows an example of the database 500 in which the reception levels are stored. As shown in FIG. 6, the database 500 includes identifiers of neighboring cells (base stations), reception levels of the common control channel, and an overall reception level within a frequency band BW allocated to the neighboring cells. When a plurality of common control channels are used (base stations 202 and 203), the reception level of each of the common control channels are acquired.

The radio controller refers to the database 500 and determines the in-out threshold used in the base station 200 (Step S1005). The method of determining the in-out threshold will be described later.

The radio controller 100 notifies the base station 200 of the determined in-out threshold (Step S1006). The base station 200 broadcasts the notified in-out threshold to the mobile station 300 (Step S1007).

Figure 4:
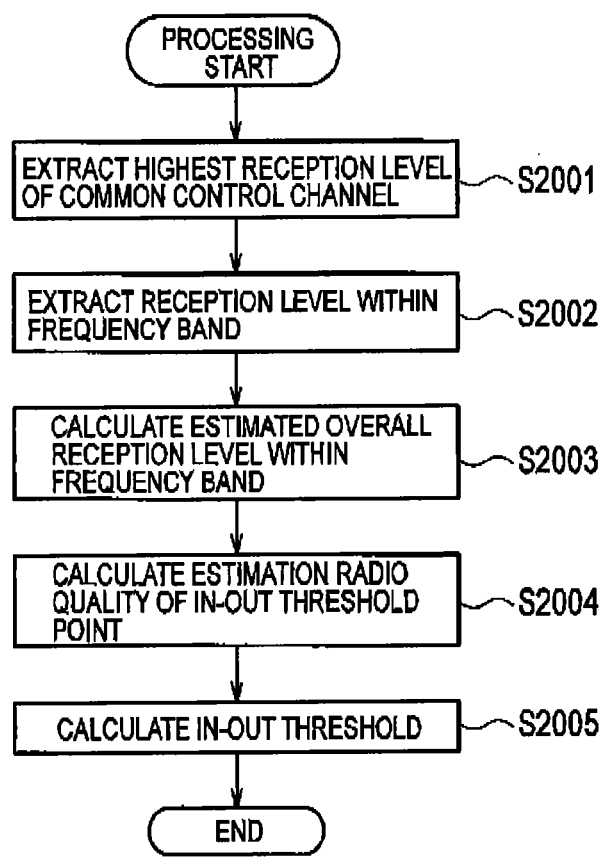
FIG. 4 is a diagram showing a flow through which the radio controller 100 determines the in-out threshold based on data on reception level stored in database 500.

FIG. 4 shows a flow through which the radio controller 100, more specifically, the in-out threshold determination unit 130 determines the in-out threshold based on data on reception level stored in the database 500.

As shown in FIG. 4, the radio controller 100 extracts the base station with the highest reception level of the common control channel among the base stations 201 to 203 stored in the database 500 (Step S2001). Specifically, the radio controller 100 extracts "−90 dBm" of the base station 202.

Then, the radio controller 100 extracts the overall reception level (−70 dBm) within the frequency band BW, stored in the database 500 (Step S2002). The radio controller 100 calculates a value obtained by adding the sum (−87 dBm) of the highest reception level (−90 dBm) in the reception levels of the common control channel transmitted by the neighboring cell in the base stations and the first offset value (e.g., 3 dB) to the extracted overall reception level as an estimated overall reception level (Step S2003).

The radio controller 100 calculates a value obtained by dividing the extracted highest level (−90 dBm) by the estimated overall reception level as an estimated radio quality (Ec/N0) at a point P (in-out point) at which the reception level becomes highest in the cell formed by the base station 200 (Step S2004).

In this embodiment, the radio controller 100 calculates the in-out threshold (Qqualmin) by adding the second offset value (e.g., 3 dB) to a value obtained by dividing the highest reception level by the estimated overall reception level.

(4) Operation and Effect

In the radio controller 100 according to the embodiment described above, the estimated overall reception level within the frequency band BW at the point P, at which the reception level of the common control channel transmitted by the base station 200 becomes the highest, in the cell 250 formed by the base station 200 is calculated based on the reception levels of the common control channel of the neighboring cells and the overall reception level within the frequency band BW allocated to the neighboring cells. Then, the in-out threshold (Qqualmin) is determined based on the calculated estimated overall reception level.

Thus, the mobile station 300 of a user can be more surely located in the cell 250 formed by the base station 200 as a small base station installed by the user. Thus, with the radio controller 100, the mobile station 300 is less likely to be located in the other cell, and the user of the mobile station 300 may surely enjoy the advantage of the increase in throughput provided by the base station 200.

In this embodiment, a value obtained by adding the sum of the highest reception level of the common control channel and the first offset value to the overall reception level is calculated as the estimated overall reception level. Accordingly, the estimated overall reception level is raised by the first offset value, and thus the base station 200 becomes relatively likely to be selected. In the embodiment, the value is calculated by dividing the highest reception level of the common control channel by the estimated overall reception level, as the in-out threshold. The second offset value is added to the value obtained by the division. Thus, the base station 200 is even more likely to be selected.

(5) Modification

In the embodiment described above, the radio control 100 (radio control information acquisition unit 110) uses the overall reception level within the frequency band BW. In a case where the overall reception level cannot be measured by the base station 200, total reception power of the common control channels transmitted by the neighboring cells in the base station may be used in place of the overall reception level.

(6) Other Embodiment

The present invention has been described by using the above-described embodiment. However, it should not be understood that the description and the drawings, which constitute one part of this disclosure, are to limit the present invention. Various alternative embodiments, examples, and operational techniques will be obvious for those who are in the art from this disclosure.

For example, in the embodiment of the present invention described above, the mobile communication system supporting the W-CDMA scheme is described as an example. In an LTE (Long Term Evolution) system as a next generation system of the W-CDMA, the base stations 200 to 203 may have the functions of the radio controller 100. Specifically, the base stations 200 to 203 can have the functions of the radio information acquisition unit 110, the radio information hold unit 120, the in-out threshold determination unit 130 and the in-out threshold notification unit 140. A radio communication state acquired by each of the base stations 200 to 203 may be shared among the base stations.

Among the functional blocks of the radio controller 100, some of the functions may be implemented in the base station.

In the embodiment described above, the first offset value and the second offset value are used. However, such offset values may not be necessary used.

As described above, the present invention naturally includes various embodiments which are not described herein. Accordingly, the technical scope of the present invention should be determined only by the matters to define the invention in the scope of claims regarded as appropriate based on the description.

Note that the contents of Japanese Patent Application No. 2010-129426 (filed on Jun. 4, 2010) are hereby incorporated by reference in their entirety.

INDUSTRIAL APPLICABILITY

According to a feature of the present invention, a mobile communication system, a base station, and a mobile communication method with which a mobile station can surely enjoy advantage of an increase in throughput provided by a small base station can be provided.

EXPLANATION OF THE REFERENCE NUMERALS

10 ... mobile telecommunications carrier network
20 ... access line carrier network
100 ... radio controller
110 ... radio information acquisition unit
120 ... radio information hold unit
130 ... in-out threshold determination unit
140 ... in-out threshold notification unit
200 to 203 ... base station
250 and 251 ... cell
300 ... mobile station
400 ... SGW
500 ... database

The invention claimed is:

1. A mobile communication system configured to control an in-out threshold for determining whether a mobile station is to camp on a cell formed by a base station, the system comprising:
   circuitry configured to
      acquire a radio communication state of a neighboring cell around the cell formed by the base station; and
      determine the in-out threshold based on an acquisition result of the radio communication state;
      measure a reception level of a common control channel transmitted by the neighboring cell in the base station and an overall reception level within a predetermined frequency band in the base station;
      calculate an estimated overall reception level within the frequency band at a location at which the reception level of the common control channel transmitted by the base station becomes the highest in the cell formed by the base station by adding the overall reception level to a sum of a first offset value and the highest reception level among the reception levels of the common control channels transmitted by the neighboring cells; and
      determine the in-out threshold based on the calculated estimated overall reception level.

2. The mobile communication system according to claim 1, wherein the circuitry is configured to calculate, as the in-out threshold, a value obtained by dividing the highest reception level by the estimated overall reception level.

3. The mobile communication system according to claim 2, wherein the circuitry is configured to calculate the in-out threshold by adding a second offset value to the value obtained by dividing the highest reception level by the estimated overall reception level.

4. The mobile communication system according to claim 1, wherein the circuitry is configured to use a total reception power of the common control channels transmitted by the neighboring cells, in place of the overall reception level.

5. A base station comprising:
   circuitry configured to
      acquire a radio communication state of a neighboring cell around a cell formed by the base station;
      determine an in-out threshold for determining whether a mobile station is to camp on a cell, based on an acquisition result of the radio communication state;
      measure a reception level of the common control channel transmitted by the neighboring cell in the base station and an overall reception level within a predetermined frequency band in the base station;
      calculate an estimated overall reception level within the frequency band at a location at which the reception level of the common control channel transmitted by the base station becomes the highest in the cell formed by the base station by adding the overall reception level to a sum of a first offset value and the highest reception level among the reception levels of the common control channels transmitted by the neighboring cells; and
      determine the in-out threshold based on the calculated estimated overall reception level.

6. A mobile communication method for controlling an in-out threshold for determining whether a mobile station is to camp on a cell formed by a base station, the method comprising the steps of:
   acquiring a radio communication state of a neighboring cell around the cell formed by the base station; and
   determining the in-out threshold based on an acquisition result of the radio communication state in the acquiring step, wherein
   the acquiring step includes measuring a reception level of the common control channel transmitted by the neighboring cell in the base station and an overall reception level within a predetermined frequency band in the base station, and
   the in-out threshold determining step includes:
      calculating an estimated overall reception level within the frequency band at a location at which the reception level of the common control channel transmitted by the base station becomes the highest in the cell formed by the base station, by adding the overall reception level to a sum of a first offset value and the highest reception level among the reception levels of the common control channels transmitted by the neighboring cells; and
      determining the in-out threshold based on the calculated estimated overall reception level.

* * * * *